US009016430B2

(12) United States Patent
Ichihashi

(10) Patent No.: US 9,016,430 B2
(45) **Date of Patent: *Apr. 28, 2015**

(54) ANCHORING OF SEPTUMS IN ACOUSTIC HONEYCOMB

(71) Applicant: Hexcel Corporation, Dublin, CA (US)

(72) Inventor: Fumitaka Ichihashi, Chandler, AZ (US)

(73) Assignee: Hexcel Corporation, Dublin, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/106,424

(22) Filed: Dec. 13, 2013

(65) Prior Publication Data

US 2014/0110188 A1 Apr. 24, 2014

Related U.S. Application Data

(63) Continuation of application No. 13/227,755, filed on Sep. 8, 2011, now Pat. No. 8,607,924.

(51) Int. Cl.

*E04B 1/84* (2006.01)
*B64C 1/40* (2006.01)
*G10K 11/162* (2006.01)
*G10K 11/172* (2006.01)
*E04B 1/82* (2006.01)
*E04B 1/74* (2006.01)

(52) U.S. Cl.

CPC ......... *G10K 11/162* (2013.01); *E04B 2001/748* (2013.01); *G10K 11/172* (2013.01)

(58) Field of Classification Search

CPC . E04B 2001/8423; E04B 1/84; E04B 1/8409; B64C 1/40

USPC ................ 181/292, 288, 213, 214, 222, 293; 244/1 N, 119, 53 B, 123.13

See application file for complete search history.

(56) References Cited

U.S. PATENT DOCUMENTS

| | | | |
|---|---|---|---|
| 3,064,345 | A | 11/1962 | Herman et al. |
| 3,952,831 | A | 4/1976 | Bernard et al. |
| 4,257,998 | A | 3/1981 | Diepenbrock et al. |
| 4,265,955 | A | 5/1981 | Harp et al. |
| 4,594,120 | A | 6/1986 | Bourland et al. |
| 4,821,841 | A | 4/1989 | Woodward et al. |
| 5,785,919 | A | 7/1998 | Wilson |
| 5,997,985 | A | 12/1999 | Clarke et al. |
| 6,085,865 | A | 7/2000 | Delvendier et al. |
| 6,114,652 | A | 9/2000 | Clarke et al. |
| 6,274,216 | B1 | 8/2001 | Gonidec et al. |
| 6,536,556 | B2 | 3/2003 | Porte et al. |
| 7,434,659 | B2 | 10/2008 | Ayle |
| 7,510,052 | B2 | 3/2009 | Ayle |
| 7,520,369 | B2 | 4/2009 | Dravet et al. |

(Continued)

FOREIGN PATENT DOCUMENTS

| | | |
|---|---|---|
| EP | 2418641 | 2/2012 |
| GB | 2098926 | 12/1982 |

*Primary Examiner* — Edgardo San Martin

(74) *Attorney, Agent, or Firm* — W. Mark Bielawski; David J. Oldenkamp

(57) ABSTRACT

A honeycomb structure dial includes cells in which septums are located to provide acoustic dampening. The cells are formed by at least our walls wherein at least two of the walls are substantially parallel to each other. The septums include warp fibers and weft fibers that are substantially perpendicular to each other. The septums are oriented in the honeycomb cells such that the weft fibers and/or warp fibers are substantially perpendicular to the parallel walls.

20 Claims, 5 Drawing Sheets

(56) References Cited

U.S. PATENT DOCUMENTS

| | | | |
|---|---|---|---|
| 7,854,298 | B2 | 12/2010 | Ayle |
| 8,047,329 | B1 | 11/2011 | Douglas et al. |
| 8,066,098 | B2 | 11/2011 | Ayle |
| 8,235,171 | B2 | 8/2012 | Douglas et al. |
| 8,397,865 | B2 | 3/2013 | Douglas et al. |
| 8,413,761 | B2 | 4/2013 | Ayle |
| 8,607,924 | B2 * | 12/2013 | Ichihashi ...................... 181/292 |
| 2005/0194210 | A1 | 9/2005 | Panossian |
| 2008/0020176 | A1 | 1/2008 | Ayle |
| 2010/0212998 | A1 | 8/2010 | Valleroy et al. |

* cited by examiner

FIG. 4
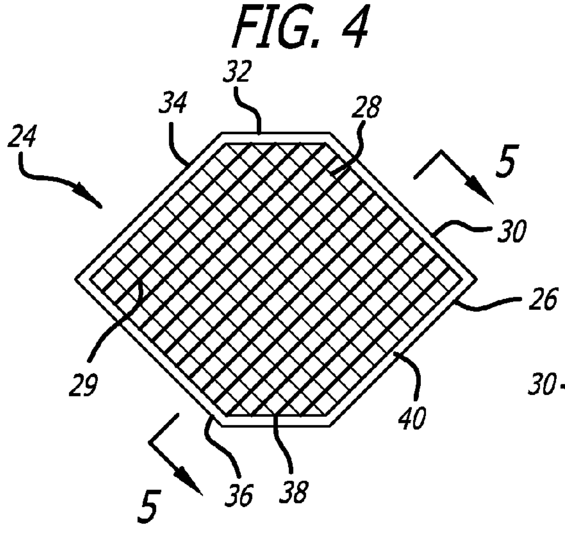
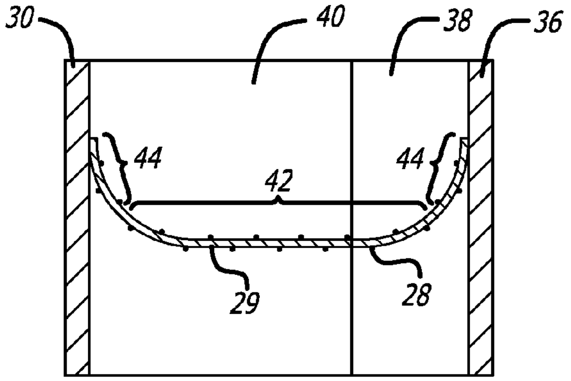
FIG. 5
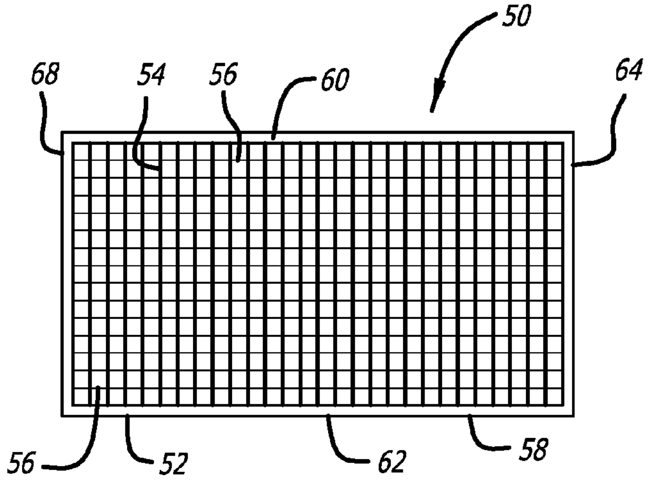
FIG. 6
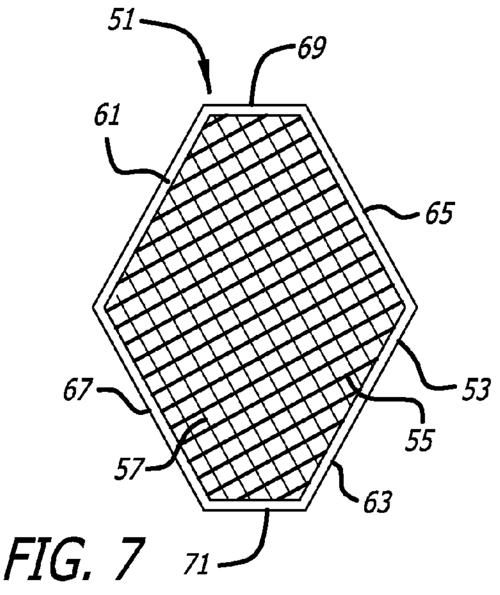
FIG. 7

ANCHORING OF SEPTUMS IN ACOUSTIC HONEYCOMB

BACKGROUND OF THE INVENTION

1. Field of the Invention

The present invention relates generally to acoustic systems that are used to attenuate noise. The invention involves using honeycomb to make nacelles and other structures that are useful in reducing the noise generated by aircraft engines or other noise sources. More particularly, the invention is directed to acoustic structures in which septum material is inserted into the cells of pre-existing honeycomb to provide dampening or attenuation of noise.

2. Description of Related Art

It is widely recognized that the best way of dealing with excess noise generated by a specific source is to treat the noise at the source. This is typically accomplished by adding acoustic damping structures (acoustic treatments) to the structure of the noise source. One particularly problematic noise source is the jet engine used on most passenger aircraft. Acoustic treatments are typically incorporated in the engine inlet, nacelle and exhaust structures. These acoustic treatments include acoustic resonators that contain relatively thin acoustic materials or grids that have millions of holes that create acoustic impedance to the sound energy generated by the engine. The basic problem that faces engineers is how to add these thin and flexible acoustic materials into the structural elements of the jet engine and surrounding nacelle to provide desired noise attenuation.

Honeycomb has been a popular material for use in aircraft and aerospace vehicles because it is relatively strong and lightweight. For acoustic applications, the goal has been to somehow incorporate the thin acoustic materials into the honeycomb structure so that the honeycomb cells are closed or covered. The closing of the cells with acoustic material creates the acoustic impedance upon which the resonator is based.

One approach to incorporating thin acoustic materials into honeycomb is referred to as the sandwich design. In this approach, the thin acoustic sheet is placed between two slices of honeycomb and bonded in place to form a single structure. This approach has advantages in that one can utilize sophisticated acoustic material designs that are woven, punched or etched to exact dimensions and the bonding process is relatively simple. However, a drawback of this design is that the strength of the structure is limited by the bond between the two honeycomb slices and the acoustic material. Also, the bonding surface between the two honeycomb slices is limited to the surface area along the edges of the honeycomb. In addition, there is a chance that some of the holes in the acoustic material may be unintentionally closed with excess adhesive during the bonding process.

A second approach uses relatively thick solid inserts that are individually bonded in place within the honeycomb cells. Once in place, the inserts are drilled or otherwise treated to form the holes that are necessary for the inserts to function as an acoustic material. This approach eliminates the need to bond two honeycomb slices together. The result is a strong structure in which the inserts are securely bonded. However, this approach also has a few drawbacks. For example, the cost and complexity of having to drill millions of holes in the solid inserts is a major drawback. In addition, the relatively thick solid inserts make the honeycomb stiff and difficult to form into non-planar structures, such as nacelles for jet engines.

Another approach involves inserting relatively lightweight septum fabric into the honeycomb cell to form a septum cap having anchoring flanges that are then glued to the honeycomb walls. The use of septum caps is described in U.S. Pat. Nos. 7,434,659; 7,510,052 and 7,854,298. This type of process requires that the septum caps be friction-locked within the cell to hold the septum caps in place prior to permanent bonding to the honeycomb wall. Friction-locking of the septum caps is an important aspect of this type of septum-insertion procedure. The septums may shift or otherwise move during handling if friction-locking is not adequate. Any shifting of the septums makes it difficult to apply adhesive uniformly to the septums during bonding. Shifting of the septums also causes uncontrolled altering of the acoustic properties. In the worst case, the septum may fall completely out of the honeycomb cell if friction locking is not adequate.

SUMMARY OF THE INVENTION

In accordance with the present invention, it was discovered that the orientation of the septum fabric within the honeycomb cell is an important factor that determines how well the septum friction-locks to the walls of the honeycomb. The invention is applicable to honeycomb cells that include at least two parallel walls where at least one of the parallel walls forms a greater portion of the cell perimeter than one or more of the other non-parallel walls. It was discovered that orienting the septum material, such that the fibers extending between the two parallel walls are substantially perpendicular to the walls, provides an effective way to fiction-lock the septum to the honeycomb. The present invention improves material utilization and fiction-locking of the septum to the honeycomb. The invention substantially reduces rework costs and inconvenience due to septums falling out of the honeycomb or otherwise shifting during handling prior to and during adhesive application.

The present invention is directed to acoustic structures that are designed to be located near a source of noise, such as a jet engine or other power plant. The structures include a honeycomb that has a first edge which is to be located nearest the source of noise and a second edge located away from the source. The honeycomb includes a plurality of walls that extend between the first and second edge of the honeycomb. The walls form a plurality of cells that each includes at least four walls. At least two of the four walls defining each cell are substantially parallel to each other. The cell walls define a perimeter around the cell where at least one of the parallel walls forms a larger portion of the cell perimeter than at least one of the other cell walls that is not parallel to the larger wall.

The septum that is inserted into the cell is an acoustic material which is made up of a plurality of warp fibers and a plurality of weft fibers. The warp fibers and weft fibers are substantially perpendicular to each other. Each of the warp fibers includes a resonator portion that is located within the cell. Each warp fiber also includes anchoring portions located at each end. Each of the well fibers also includes a resonator portion located within the cell and anchoring portions located at each end. The anchoring portions of the warp and well fibers are bonded to the honeycomb walls. As a feature of the invention, the septum is oriented in the cell such that resonator portions of either the warp or well fibers are substantially perpendicular to the larger parallel cell wall.

The present invention is also directed to the precursor structures that are formed when the septum is friction-locked within the honeycomb cell. It was discovered that the friction-locking provided by the perpendicular orientation of the septum fibers in accordance with the present invention prevents shifting of the septums within the honeycomb during all phases of routine handling of the precursor structure prior to and during permanent bonding of the septums to the honeycomb. The present invention farther directed to methods for making acoustic structures.

The present invention provides a number of advantages in addition to secure friction-locking of the septum to the core. For example, the amount of septum material is reduced because the same degree of friction-locking can be achieved with smaller sized anchoring portions. In addition, less material is wasted when the septum is cut from the septum fabric. Further, less folding of the septum material occurs when the septum is inserted into the cell because the size of the anchoring portion can be reduced and the perpendicular orientation of the fabric tends to reduce the extra mesh formation at the fold. The perpendicular fiber orientation within the cell also tends to reduce bunching of the septum material in the cell corners. The amount of adhesive needed to bond the septum to the honeycomb wall is also reduced due to the smaller anchoring portions and reduced fabric bunching. The septum can also be placed closer to the honeycomb edge, since the anchoring portions do not need to be as long in order to achieve adequate friction-locking. This is particularly advantageous for thin honeycomb where the size of the septum anchoring portion may approach the thickness of the honeycomb.

The above discussed and many other featured and attendant advantages of the present invention will become better understood by reference to the following detailed description when taken in conjunction with the accompanying drawings.

BRIEF DESCRIPTION OF THE DRAWINGS

FIG. 4 is a simplified view showing the orientation in a honeycomb cell of a septum cut from a ribbon of acoustic fabric as shown in FIG. 2

FIG. 5 is a simplified sectional view of FIG. 4 showing the orientation of a weft fiber within a honeycomb cell and also depicting the anchoring portions of the fiber and the resonator portion.

FIG. 6 is a simplified view showing the orientation in a honeycomb of an alternate embodiment of a septum in accordance with the present invention.

FIG. 7 is a simplified view showing the orientation in a honeycomb of another alternate embodiment of a septum in accordance with the present invention

DETAILED DESCRIPTION OF THE INVENTION

Figure 1:
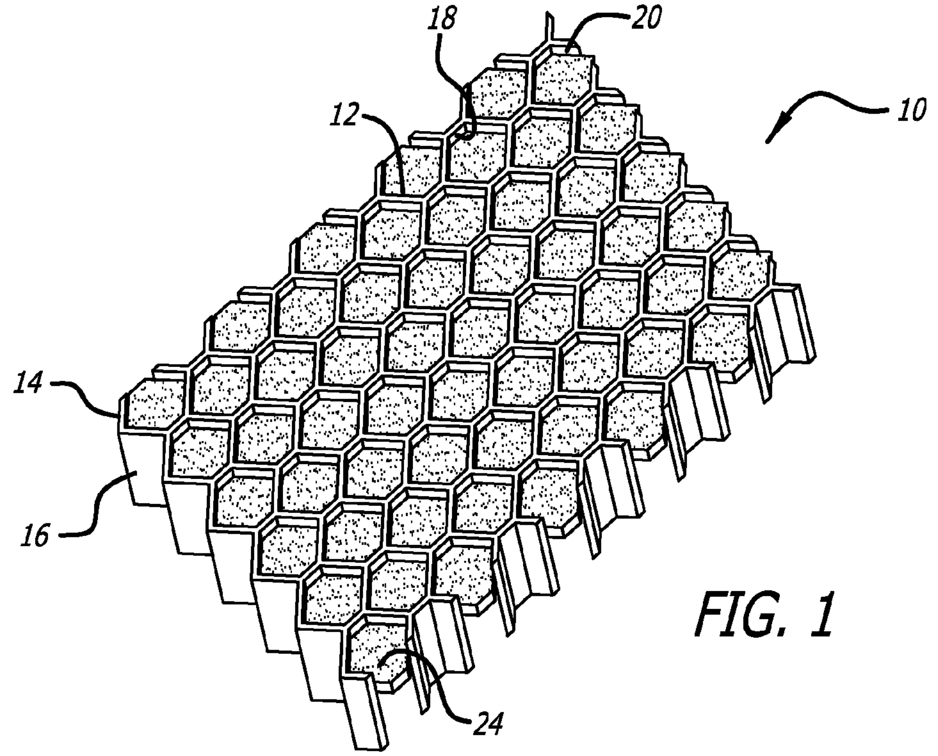
FIG. 1 is a perspective view of an exemplary acoustic structure in accordance with the present invention.
Figure 8:
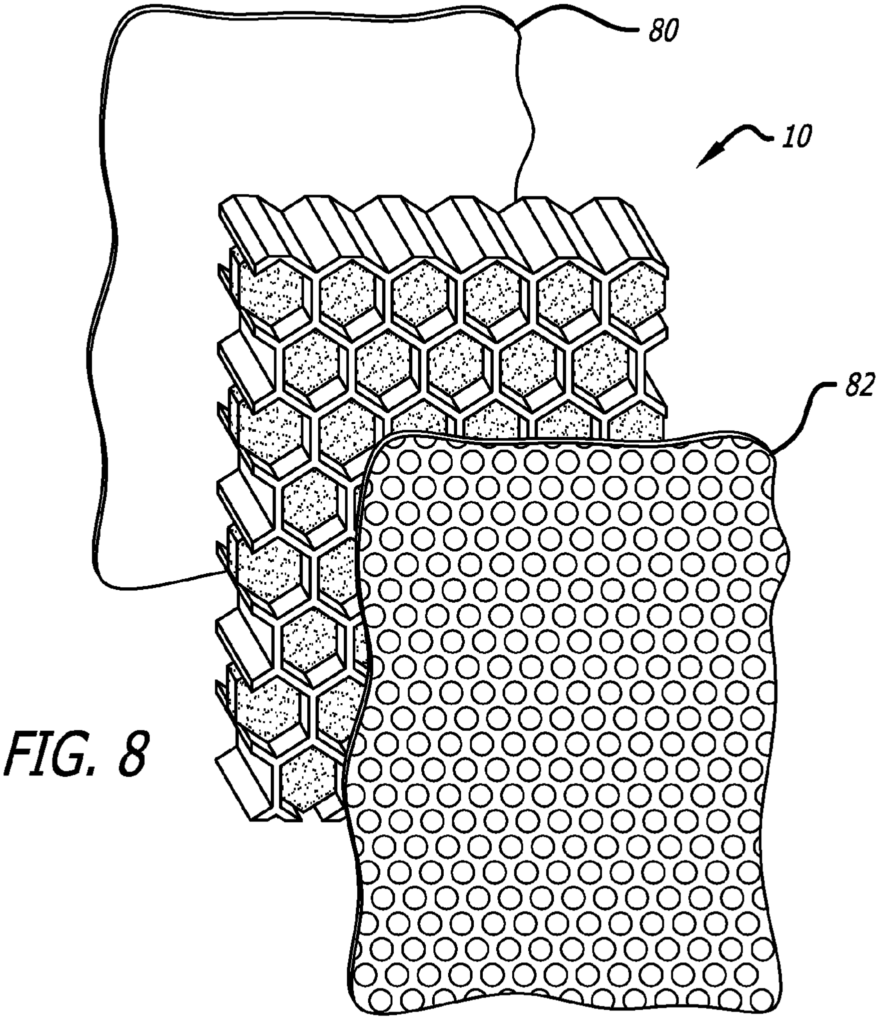
FIG. 8 is an exploded perspective view showing a portion of a solid skin, acoustic structure and perforated skin that are combined together to form an acoustic structure of the type shown in FIG. 9.

An exemplary acoustic structure in accordance with the present invention is shown generally at 10 in FIGS. 1 and 8. The acoustic structure 10 includes a honeycomb 12 having a first edge 14 which is to be located nearest the noise source and a second edge 16. The honeycomb 10 includes walls 18 that extend between the two edges 14 and 16 to define a plurality of cells 20. Each of the cells 20 has a depth (also referred to as the core thickness) that is equal to the distance between the two edges 14 and 16. Each cell 20 also has a cross-sectional area that is measured perpendicular to the cell walls 18. The honeycomb can be made from any of the conventional materials used in making honeycomb panels including metals, ceramics, and composite materials.

Septums 24 are located within the cells 20. It is preferred, but not necessary, that the septums 24 be located in most, if not all, of the cells 20. In certain situations, it may be desirable to insert the septums 24 in only some of the cells to produce a desired acoustic effect. Alternatively, it may be desirable to insert two or more septums into a single cell. It also may be desirable to locate the septums 24 at different depths within different cells 20 located at different places within the honeycomb In FIG. 4, an exemplary septum 24 in accordance with the present invention is shown located within an exemplary honeycomb cell 26. The septum 24 is cut or otherwise formed from a sheet of acoustic material that is composed of woven fibers. The woven material includes warp fibers 28 and well fibers 29 that are substantially perpendicular to each other.

The perimeter of the cell 26 is defined or formed by cell walls 30, 32, 34, 36, 38 and 40. Cell walls 30 and 36 are parallel to each other and form a first pair of parallel cell walls. Cell walls 34 and 40 are also parallel to each other and form a second pair of parallel cell walls. Cell walls 32 and 38 are also parallel to each other and form a third pair of parallel walls. Since the cell 26 is not in the shape of a regular hexagon, the first and second pair of parallel walls are wider than the third pair of parallel walls. Each of the walls in the first and second pair of parallel walls makes up a larger portion of the cell perimeter than each of the walls in the third pair of parallel walls.

In accordance with the present invention, septum 24 is oriented so that the warp fibers 28 are perpendicular to the pair of wider parallel walls 30 and 36. This orientation also places the well fibers 29 perpendicular to the other pair of wider parallel walls 34 and 40. It was discovered that orienting the septum fibers perpendicular to the wider parallel walls provides an especially effective way to friction-lock the septum 24 within the cell 26.

Each of the well and warp fibers includes a central resonator portion and an anchoring portion located at each end of the fiber for attaching the fibers to the cell walls. In FIG. 5, a simplified cross-sectional view of the septum 24 is depicted to show the resonator portion 42 and anchoring portions 44 of a well fiber 29. The anchoring portions 44 serve to friction-lock the septum 24 in place prior to application of an adhesive to permanently bond the anchoring portions 44 to the honeycomb wall. For the purposes of this detailed description, a fiber is oriented substantially perpendicular to a cell wall when the resonator portion of the fiber is substantially perpendicular to the cell wall. Substantially perpendicular means that the angle between the resonator portion of the fiber and the cell wall, in the plane of the septum is between 80 and 100 degrees and more preferably between 85 and 95 degrees.

Arty of the standard woven fiber acoustic materials may be used to form the septums. These acoustic materials are typically provided as relatively thin sheets of an open mesh fabric that are specifically designed to provide noise attenuation. It is preferred that the acoustic material be an open mesh fabric that is woven from monofilament fibers. The fibers may be composed of glass, carbon, ceramic or polymers. Monofilament polymer fibers made from polyamide, polyester, polyethylene chlorotrifluoroethylene (ECTFE), ethylene tetrafluoroethylene (ETFE), polytetrafluoroethyloene (PTFE), polyphenylene sulfide (PPS), polyfluoroethylene propylene (FEP), polyether ether ketone (PEEK), polyamide 6 (Nylon 6, PA6) and polyamide 12 (Nylon 12, PA12) are just a few examples. Open mesh fabric made from PEEK is preferred for high temperature applications. Open mesh acoustic fabrics and other acoustic materials that may be used to form the septum caps in accordance with the present invention are available from a wide variety of commercial sources. For example, sheets of open mesh acoustic fabric may be obtained from SEFAR America Inc. (Buffalo Division Headquarters 111 Calumet Street Depew, N.Y. 14043) under the trade names SEFAR PETEX, SEFAR NITEX and SEFAR PEEKTEX.

Although the acoustic fabric can be made from a combination of different woven fibers, it is preferred that the fibers in the acoustic fabric be made from the same material. In many acoustic fabrics the warp direction fibers (warp fibers) are generally made from smaller diameter fibers than the well direction fibers (weft fibers). Accordingly, the well fibers tend to be stronger and less flexible than the warp direction fibers. It was discovered that the less flexible fibers are more effective for friction-locking the septum to the cell wall. When possible, it is preferred that the septum be oriented so that the resonator portions of the less flexible weft fibers are perpendicular to the honeycomb wall that forms the largest part of the cell perimeter. Flexibility of the weft fibers ma also be increased relative to the warp fibers by altering the chemistry (rather than the diameter) of the well fiber to provide a stiffer fiber.

In woven fabric where the fibers in one direction are less flexible or stronger than the cross-direction fibers, the stronger fibers are commonly referred to as the dominant fibers. The present invention may be used in connection with septums made from all types of woven acoustic fabric including those where there is no dominant fiber. However, it is preferred that the woven septum material include dominate fibers and that the dominate fibers are the weft fibers.

Figure 2:
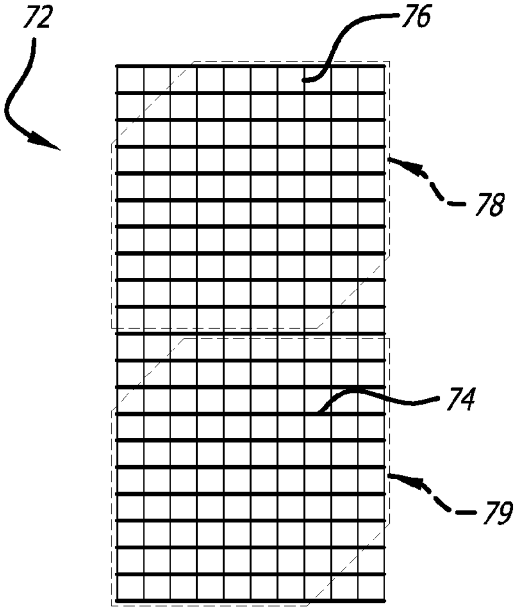
FIG. 2 is a simplified view showing the pattern for cutting two septums in accordance with the present invention from a ribbon of acoustic fabric.

Acoustic fabric is typically provided as a sheet of material that is cut into multiple ribbons. The septums are then cut from the ribbons. FIG. 2 provides a simplified representation of a portion of a typical ribbon of acoustic material 72. The ribbon 72 includes weft fibers 74 and warp fibers 76. The weft fibers 74 are the dominant fiber. Septums for insertion into cells of the type shown in FIG. 4 are cut from the ribbon as outlined at 78 and 79. Cutting of the ribbon so as to provide a septum that can be oriented as in FIG. 4 results in only a small portion of the ribbon material being wasted. This is a valuable feature of the invention which unexpectedly results from having to cut the septum from the acoustic fabric ribbon so as to meet the orientation requirements set forth above when the septums are inserted into the honeycomb cells.

Figure 3:
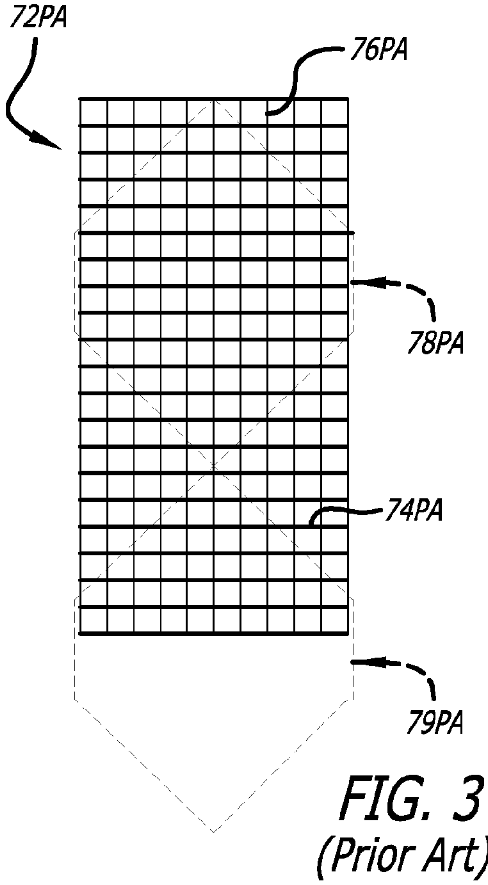
FIG. 3 (Prior Art)
FIG. 3 is a simplified view showing a prior art pattern for cutting septums from the same ribbon of acoustic fabric shown in FIG. 2.

The typical prior art method for cutting septums from a ribbon of acoustic material is shown in FIG. 3. The identifying numbers correspond to the identifying numbers in FIG. 2, except that "PA" has been added to identify the ribbon as being cut according to the prior art method. As can be seen, a substantial amount of acoustic material is wasted using the prior art method for forming septums when compared to the present invention.

In FIG. 6, an additional exemplary septum 50 in accordance with the present invention is shown located within an exemplary honeycomb cell 52. The septum 50 is cut or otherwise formed from a sheet of acoustic material that is composed of woven fibers where the weft fibers 54 are less-flexible (stronger) than the warp fibers 56. The honeycomb cell 58 includes a pair of parallel walls 60 and 62 that are each much wider than the other two walls 64 and 68. As a preferred feature of the invention, the dominant weft fibers 54 are oriented perpendicular to the wider parallel walls 60 and 62.

In FIG. 7, a further additional exemplary septum 51 in accordance with the present invention is shown located within an exemplary honeycomb cell 53. The septum 51 is cut or otherwise formed from a sheet of acoustic material that is composed of woven fibers where the weft fibers 55 are less-flexible (stronger) than the warp fibers 57. The honeycomb cell 53 includes a first pair of parallel walls 61 and 63. Cell walls 65 and 67 are also parallel to each other and form a second pair of parallel cell walls. Cell walls 69 and 71 are also parallel to each other and form a third pair of parallel walls. The first and second pair of parallel walls are wider than the third pair of parallel walls. Each of the walls in the first and second pair of parallel walls makes up a larger portion of the cell perimeter than each of the walls in the third pair of parallel walls.

As discussed above, the septum 51 is oriented so that the weft fibers 55 are perpendicular to the pair of wider parallel walls 65 and 67. Inserting the septum so that the stiffer weft fibers 55 are perpendicular to the Wider parallel walk provides an especially effective way to friction-lock the septum 51 within the cell 53.

The present invention is applicable to a wide variety of cells shapes. The preferred cell cross-sectional shape is a polygon having more than four walls that for the perimeter of the polygon and where the width of the walls, with respect to the perimeter, are not all equal. Hexagonal and rectangular cells with cross-sectional shapes similar to the ones shown in FIGS. 4, 6 and 7 are preferred.

Figure 10:
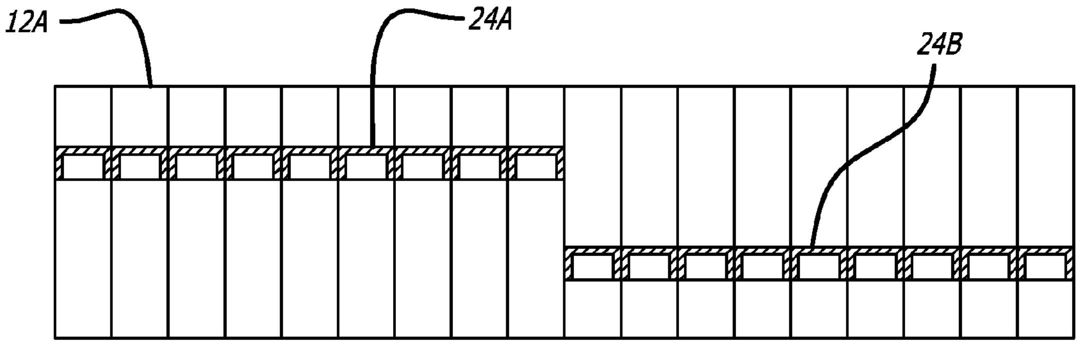
FIG. 10 is a simplified view showing the orientation in a honeycomb of an embodiment of the present invention where the septum are located at different heights within the same honeycomb.

The septums 24 may be inserted into the honeycomb cell to provide a wide variety of acoustic designs. For example, the septums may be located at different levels within the honeycomb 12A as shown at 24A and 24B in FIG. 10. This type of design allows fine-tuning of the noise attenuation properties of the acoustic structure. The two-level design shown in FIG. 10 is intended only as an example of the wide variety of possible multi-level septum arrangements that are possible in accordance with the present invention. As will be appreciated by those skilled in the art, the number of different possible septum placement levels is extremely large and can be tailored to meet specific noise attenuation requirements.

Figure 11:
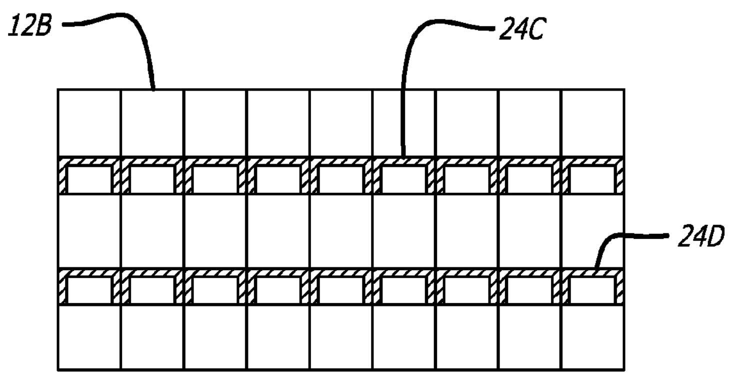
FIG. 11 is a simplified view showing the orientation in a honeycomb of an embodiment of the present invention where two septums are located at different heights within a single honeycomb cell.

Another example of an insertion configuration for the septums 24 is shown in FIG. 11. In this configuration, two sets of septums 24C and 24D are inserted into the honeycomb 12B to provide each cell with two septums. As is apparent, numerous possible additional configurations are possible where three or more septum caps are inserted into a given cell. In addition, the multi-level insertion design exemplified in FIG. 10 may be combined with the multiple insertion per cell design exemplified in FIG. 11 to provide an unlimited number of possible septum insertion configurations that can be used to fine time the acoustic structure to provide optimum noise attenuation for a given source of noise.

Figure 12:
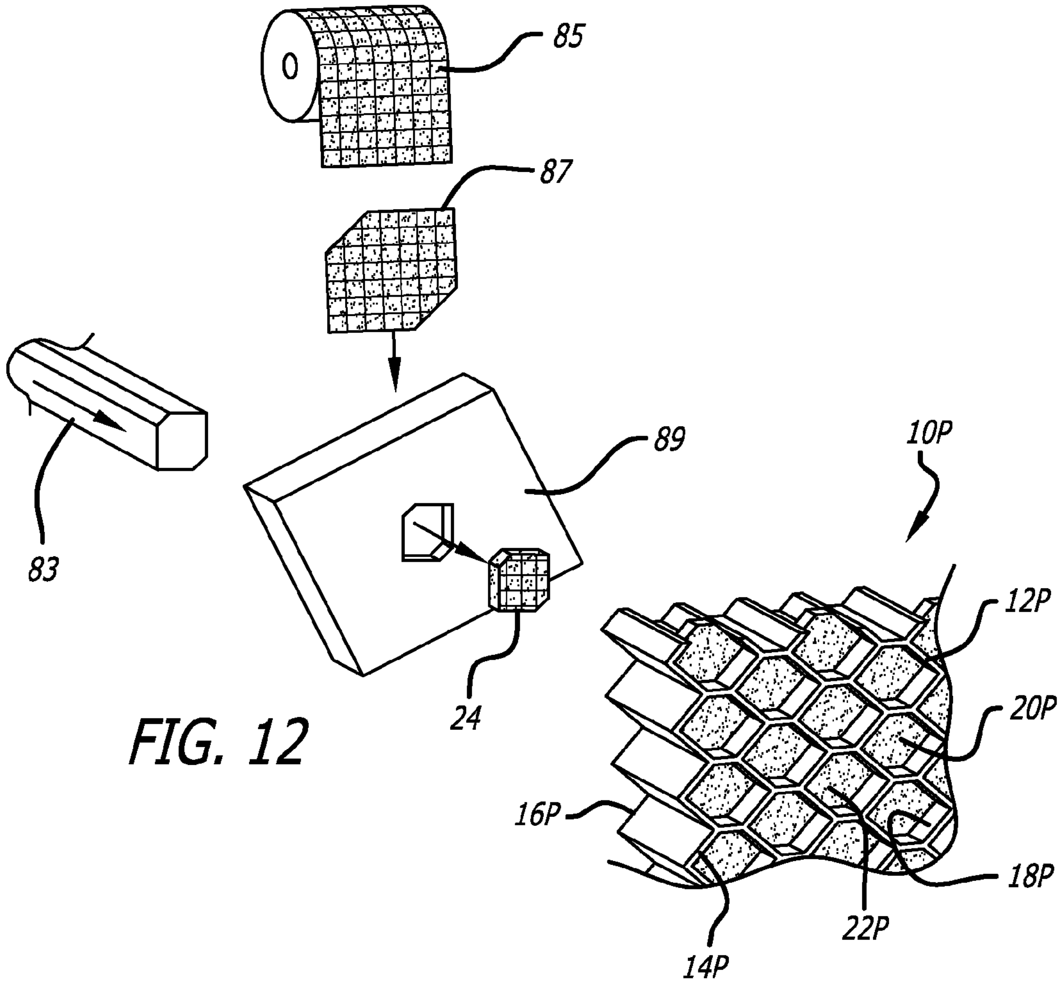
FIG. 12 is a simplified view demonstrating insertion of the septum into the cells of a honeycomb to form a precursor structure where the septums are friction-locked within the cells.

The preferred method for inserting the septums into the honeycomb to form a precursor structure where the septums are friction-locked within the honeycomb cell is shown in FIG. 12. The reference numerals used to identify the honeycomb structure in FIG. 12 are the same as in FIG. 1, except that they include a "P" to indicate that the structure is a precursor structure wherein the septums are not yet permanently bonded to the cell walls.

As shown in FIG. 12, the septum fabric 87 is cut from a ribbon of fabric material 85 to provide a pre-cut septum of the type shown in FIG. 2 at 78 and 79. An appropriately sized plunger 83 is used to force the septum fabric 87 through die 89 to form the septum cap 24, which is then inserted into the cell using the plunger 83. It should be noted that the use of a cap-folding die 89 to form the septum cap from the individual pieces of pre-cut acoustic fabric is preferred, but not required. It is possible to use the honeycomb as the die and form the septum cap by simply forcing the pre-cut fabric 87 into the cells using plunger 83. However, the edges of many honeycomb panels tend to be relatively jagged because the panels are typically cut from a larger block of honeycomb during the fabrication process. Accordingly, the honeycomb edges tend to catch, tear and contaminate the acoustic fabric when a flat sheet of fabric is forcibly inserted directly into the cell. Accordingly, if desired, the cap-folding die may be eliminated, but only if the edges of the honeycomb are treated to remove any rough or jagged edges It is important that the size/shape of the septum and the size/shape of the plunger and die be chosen such that the septum cap can be inserted into the cell without damaging the acoustic material while at the same time providing enough frictional contact between the anchoring portions of the septum fibers and the cell wall to hold the septum in place during subsequent handling of the precursor structure. Routine experimentation may be used to establish the necessary frictional locking for septums made from a particular acoustic fabric, provided that the guidelines set forth above with respect to weft and warp fiber orientation for various cell shapes are followed. The amount of frictional locking or holding should be sufficient to keep the septum caps from shifting or otherwise moving, even if the precursor structure is inadvertently dropped during handling.

A precursor structure is shown at 10*p* in FIG. 12 where the septum caps 24P are held in place only by frictional locking. As mentioned previously, the frictional locking must be sufficient to hold the septum caps securely in position until they can be permanently bonded using an appropriate adhesive. The adhesive that is used can be any of the conventional adhesives that are used in honeycomb panel fabrication. Preferred adhesives include those that are stable at high temperature (300-400° F.). Exemplary adhesives include epoxies, acrylics, phenolics, cyanoacrylates, BMI's, polyamide-imides, and polyimides.

The adhesive may be applied to the fiber anchoring portion/cell wall interface using a variety of known adhesive application procedures. An important consideration is that the adhesive should be applied in a controlled manner. The adhesive, as a minimum, should be applied to the anchoring portion of the fibers at their interface with the cell wall. In some cases, it is desirable to fine tune the acoustic structure by covering part of the resonator portion of the fibers with adhesive. Application of adhesive to the resonator portion of the fibers results in closing or at least reducing the size of the openings in the mesh or Other acoustic material. Uncontrolled application of adhesive to the resonator portion of the septum is generally undesirable and should be avoided. Accordingly, adhesive application procedures that can provide selective and controlled application of adhesive to the anchoring portion of the fibers at their interface with the cell walls may be used.

Figure 13:
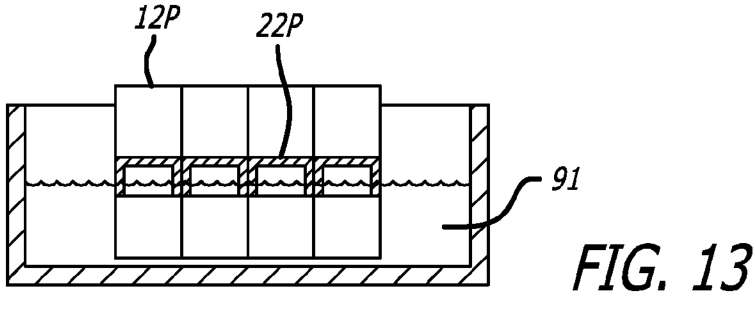
FIG. 13 is a simplified view demonstrating an exemplary method for applying adhesive to the anchoring portions of the septum fibers.

An exemplary adhesive application procedure is shown in FIG. 13. In this exemplary procedure, the honeycomb 12P is simply dipped into a pool 91 of adhesive so that only the anchoring portions of the septum fibers are immersed in the adhesive. The adhesive can be accurately applied to the fiber anchoring portion/cell wall interface using this dipping procedure provided that the septums are accurately fiction-locked at the same level prior to dipping. For septums located at different levels, multiple dipping steps are required. Alternatively, the adhesive could be applied using a brush or other site-specific application technique. Some of these techniques may be used to coat the core walls with the adhesive before the septum is inserted. Alternatively, the adhesive may be screen printed onto the septum material and staged before insertion into the core The dipping procedure for applying the adhesive that is depicted in FIG. 13 is preferred because the anchoring portions of the fibers tend to wick the adhesive upward by capillary action. This upward wicking provides for fillet formation were the anchoring portion of the fibers meet the cell wall. The formation of adhesive fillets at the interface between the anchoring portions of the fibers and the cell wall not only provides for good bonding to the cell wall, but also provides a well-defined boundary between the adhesive and the resonator portion to insure that the acoustic properties of the septum are not unintentionally affected by the adhesive. The adhesive fillets also tend to cover and eliminate air gaps that may form between the septum material and the cell walls due to wrinkles in the material.

The acoustic structures in accordance with the present invention may be used in a wide variety of situations where noise attenuation is required. The structures are well suited for use in connection with power plant systems where noise attenuation is usually an issue. Honeycomb is a relatively lightweight material. Accordingly, the acoustic structures of the present invention are particularly well suited for use in aircraft systems. Exemplary uses include nacelles for jet engines, cowlings for large turbine or reciprocating engines and related acoustic structures.

Figure 9:
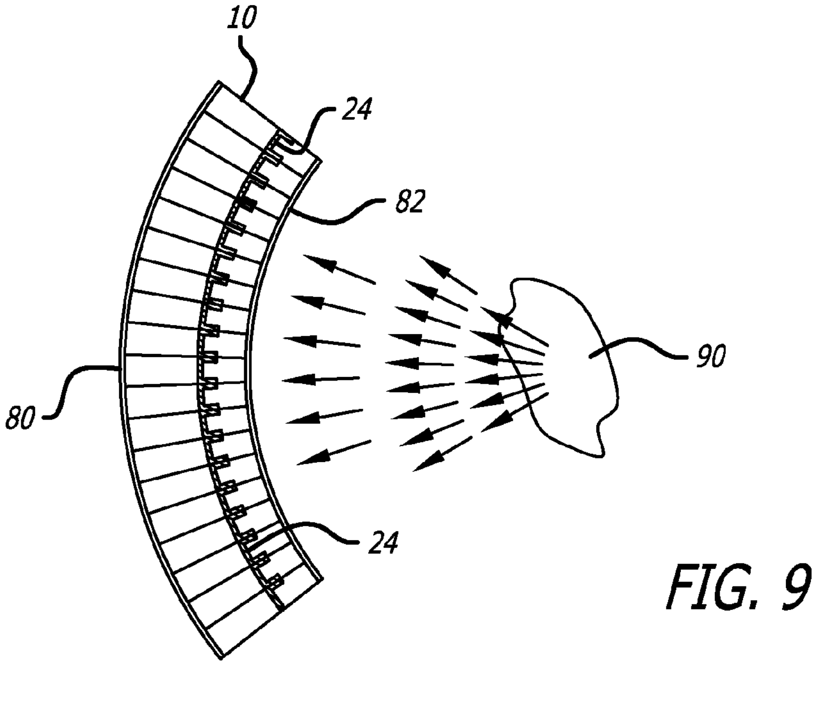
FIG. 9 is a partial sectional view of an exemplary acoustic structure (nacelle) that is located near a noise source (jet engine). The acoustic structure includes an acoustic honeycomb sandwiched between a solid skin and a perforated skin.

The basic acoustic structure of the present invention is typically heat-formed into the final shape of the engine nacelle and then the skins or sheets of outer material are bonded to the outside edges of the formed acoustic structure with an adhesive layer(s). This completed sandwich is cured in a holding tool, which maintains the complex shape of the nacelle during the bonding. For example, as shown in FIG. 8, the acoustic structure 10 is bonded on one side to a solid sheet or skin 80 and a perforated skin or sheet 82 is bonded to the other side to form an acoustic panel. The bonding of the solid skin 80 and perforated skin 82 is typically accomplished on a bonding tool at elevated temperature and pressure. The bonding tool is generally required in order to maintain the desired shape of the acoustic structure during the panel formation process. In FIG. 9, a portion of the completed acoustic panel is shown in position as part of a nacelle surrounding a jet engine, which is shown diagrammatically at 90.

Having, thus described exemplary embodiments of the present invention, it should be noted by those skilled in the art that the within disclosures are exemplary only and that various other alternatives, adaptations and modification may be made within the scope of the present invention. Accordingly, the present invention is not limited to the above preferred embodiments and examples, but is only limited by the following claims.

What is claimed is:

1. An acoustic structure that is adapted to be located near a source of noise, said acoustic structure comprising:

a honeycomb comprising a first edge to be located nearest said source of noise and a second edge, said honeycomb further comprising a plurality of walls, said walls comprising an upper edge located at said first edge of said honeycomb and a lower edge located at said second edge of said honeycomb, said walls further comprising side edges that extend between said first and said second edges of said honeycomb, said walls being connected to each other along said side edges, said walls defining a plurality of cells wherein at least one of said cells is defined by at least four of said walls and wherein at least two of said walls defining said cell form a pair of walls that are substantially parallel to each other and wherein said walls define a perimeter around said cell wherein at least one of said parallel walls forms a larger portion of said cell perimeter than at least one of the cell walls that is not parallel with said larger wall;

a septum located within said cell, said septum comprising an acoustic material that comprises a plurality of warp fibers and a plurality of weft fibers, said warp fibers and weft fibers being composed of glass, carbon, ceramic or polymer, said warp fibers and weft fibers being substantially perpendicular to each other, wherein each of said warp fibers comprises a resonator portion located within said cell and anchoring portions located at each end of said warp fiber and wherein each of said weft fibers comprises a resonator portion located within said cell and anchoring portions located at each end of said weft fiber, said septum being oriented in said cell such that resonator portions of either said warp or weft fibers are substantially perpendicular to said larger wall in the direction extending between the sides of said larger wall; and an adhesive that bonds said anchoring portions of said warp and weft fibers to said walls.

2. An acoustic structure according to claim 1 wherein said warp fibers and said well fibers are composed of a polymer selected from the group consisting of polyamide, polyester, polyethylene chlorotrifluoroethylene, ethylene tetrafluoroethylene, polytetrafluoroethylene, polyphenylene sulfide, polyfluoroethylene and polyether ether ketone.

3. An acoustic structure according to claim 2 wherein said warp fibers and said well fibers are composed of monofilaments of polyether ether ketone.

4. An acoustic structure according to claim 1 wherein at least two septums are located within said cell.

5. An acoustic structure according to claim 1 wherein said plurality of cells comprises a first cell and a second cell wherein said septum in said first cell is located at a different level between the first and second edges of said honeycomb than said septum located in said second cell.

6. An acoustic structure according to claim 1 wherein a part of said resonator portion is covered with said adhesive.

7. A method for making an acoustic structure that is adapted to be located near a source of noise, said method comprising the steps of:

providing a honeycomb comprising a first edge to be located nearest said source of noise and a second edge, said honeycomb further comprising a plurality of wall, said walls comprising an upper edge located at said first edge of said honeycomb and a lower edge located at said second edge of said honeycomb, said walls further comprising side edges that extend between said first and said second edges of said honeycomb, said walls being connected to each other along said side edges, said walls defining a plurality of cells wherein at least one of said cells is defined by at least four of said walls and wherein at least two of said walls defining said cell form a pair of walls that are substantially parallel to each other and wherein said walls define a perimeter around said cell wherein at least one of said parallel walls forms a larger portion of said cell perimeter than at least one of the cell walls that is not parallel with said larger wall;

inserting a septum into said cell, said septum comprising an acoustic material that comprises a plurality of warp fibers and a plurality of well fibers, said warp fibers and well fibers being composed of glass, carbon, ceramic or polymer, said warp fibers and weft fibers being substantially perpendicular to each other, wherein each of said warp fibers comprises a resonator portion located within said cell and anchoring portions located at each end of said warp fiber and wherein each of said well fibers comprises a resonator portion located within said cell and anchoring portions located at each end of said weft fiber, said septum being inserted in said cell such that resonator portions of either said warp or weft fibers are substantially perpendicular to said larger wall in the direction extending between the sides of said larger wall; and bonding said anchoring portions of said warp and weft fibers to said walls.

8. A method for making an acoustic structure according to claim 7 wherein said warp fibers and said weft fibers are composed of a polymer selected from the group consisting of polyamide, polyester, polyethylene chlorotrifluoroethylene, ethylene tetrafluoroethylene, polytetrafluoroethylene, polyphenylene sulfide, polyfluoroethylene and polyether ether ketone.

9. A method for making an acoustic structure according to claim 8 wherein said warp fibers and said weft fibers are composed of monofilaments of polyether ether ketone.

10. A method for making an acoustic structure according to claim 7 wherein at least two septums are inserted within said cell.

11. A method for making an acoustic structure according to claim 7 wherein said plurality of cells comprises a first cell into which a first septum is inserted and a second cell into which a second septum is inserted wherein said first septum is inserted into said first cell to a level between the first and second edges of said honeycomb that is different from the level to which said second septum is inserted into said second cell.

12. A method for making an acoustic structure according to claim 7 wherein an adhesive is use to bond said anchoring portion to said walls and wherein a part of said resonator portion is covered with said adhesive.

13. A nacelle for an aircraft engine that comprises an acoustic structure according to claim 1.

14. A nacelle for an aircraft engine that comprises an acoustic structure according to claim 2.

15. A nacelle for an aircraft engine that comprises an acoustic structure according to claim 3.

16. A nacelle for an aircraft engine that comprises an acoustic structure according to claim 4.

17. A nacelle for an aircraft engine that comprises an acoustic structure according to claim 5.

18. A nacelle for an aircraft engine that comprises an acoustic structure according to claim 6.

19. An aircraft that comprises an acoustic structure according to claim 1.

20. An aircraft that comprises an acoustic structure according to claim 6.

* * * * *